(12) United States Patent
Asayama et al.

(10) Patent No.: US 10,380,779 B2
(45) Date of Patent: Aug. 13, 2019

(54) WEARABLE INFORMATION PROCESSING DEVICE

(71) Applicant: SONY CORPORATION, Tokyo (JP)

(72) Inventors: Tetsuya Asayama, Tokyo (JP); Yoshinori Oota, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/535,130

(22) PCT Filed: Oct. 21, 2015

(86) PCT No.: PCT/JP2015/079668
§ 371 (c)(1),
(2) Date: Jun. 12, 2017

(87) PCT Pub. No.: WO2016/103880
PCT Pub. Date: Jun. 30, 2016

(65) Prior Publication Data
US 2018/0025519 A1   Jan. 25, 2018

(30) Foreign Application Priority Data

Dec. 25, 2014 (JP) .................. 2014-262137

(51) Int. Cl.
*G06F 3/01* (2006.01)
*G09G 3/00* (2006.01)
(Continued)

(52) U.S. Cl.
CPC ............ *G06T 11/60* (2013.01); *G02B 27/017* (2013.01); *G02B 27/0172* (2013.01);
(Continued)

(58) Field of Classification Search
CPC . G06T 19/006; G06T 3/20; G06F 2200/1614; G09G 2340/0492
See application file for complete search history.

(56) References Cited

U.S. PATENT DOCUMENTS

2006/0119539 A1   6/2006  Kato et al.
2006/0238878 A1*  10/2006 Miyake .............. G02B 27/0176
                                                              359/630
(Continued)

FOREIGN PATENT DOCUMENTS

CN     101910998 A    12/2010
EP       2249237 A1   11/2010
(Continued)

OTHER PUBLICATIONS

International Search Report and Written Opinion of PCT Application No. PCT/JP20151079668, dated Jan. 12, 2016, 02 pages of English Translation and 08 pages of ISRWO.

*Primary Examiner* — Jeffery A Brier
(74) *Attorney, Agent, or Firm* — Chip Law Group

(57) ABSTRACT

An information processing device is provided which is mounted on the head of the human body and which is capable of maintaining usability regardless of the attachment direction. The information processing device includes an operation detection unit that detects an operation performed with respect to the information processing device and a control unit that based on an attitude of the information processing device, determines an action to be conducted in correspondence with an operation detected by the operation detection unit.

14 Claims, 11 Drawing Sheets

(51) Int. Cl.
*G09G 5/00* (2006.01)
*G02B 27/01* (2006.01)
*G06T 11/60* (2006.01)

(52) U.S. Cl.
CPC .......... *G02B 27/0179* (2013.01); *G06F 3/011* (2013.01); *G06F 3/012* (2013.01); *G09G 3/001* (2013.01); *G09G 5/00* (2013.01); *G02B 2027/014* (2013.01); *G02B 2027/0178* (2013.01); *G02B 2027/0181* (2013.01); *G09G 2340/0492* (2013.01); *G09G 2340/14* (2013.01)

(56) References Cited

U.S. PATENT DOCUMENTS

| | | | |
|---|---|---|---|
| 2010/0007608 A1* | 1/2010 | Otsuki | G02B 27/0176 345/168 |
| 2010/0281431 A1 | 11/2010 | Kano et al. | |
| 2014/0184867 A1 | 7/2014 | Sudo | |

FOREIGN PATENT DOCUMENTS

| | | | |
|---|---|---|---|
| JP | 2004-233776 A | | 8/2004 |
| JP | 2004233776 A | * | 8/2004 |
| JP | 2014-127089 A | | 7/2014 |
| JP | 2014-146871 A | | 8/2014 |
| WO | 2009/087992 A1 | | 7/2009 |

* cited by examiner

WEARABLE INFORMATION PROCESSING DEVICE

CROSS REFERENCE TO RELATED APPLICATIONS

This application is a U.S. National Phase of International Patent Application No. PCT/JP2015/079668 filed on Oct. 21, 2015, which claims priority benefit of Japanese Patent Application No. JP 2014-262137 filed in the Japan Patent Office on Dec. 25, 2014. Each of the above-referenced applications is hereby incorporated herein by reference in its entirety.

TECHNICAL FIELD

The present disclosure relates to an information processing device.

BACKGROUND ART

Recently, technical development related to information processing devices worn on the head is being conducted. Such an information processing device is called a head-mounted display (HMD), for example, and includes a function of displaying images to a user wearing the HMD.

For example, Patent Literature 1 discloses a head-mounted image display device provided with an eyepiece lens and a light guide unit that guides emitted image light to a user's eye, which adjusts the emission angle of the emitted image light by moving the eyepiece lens or the light guide unit.

Additionally, HMDs generally are designed under the assumption that the HMD is attached in a predetermined direction. For example, the monocular HMD as disclosed in Patent Literature 1 is designed under the assumption that the HMD is attached either to the right or to the left of the user's head.

CITATION LIST

Patent Literature

Patent Literature 1: JP 2012-63638A

DISCLOSURE OF INVENTION

Technical Problem

However, with an HMD of the related art as disclosed in Patent Literature 1, if the HMD is attached in a different direction from the predetermined direction, the user interface provided by the HMD will not be in conformity with the attachment side, thereby making usage of the HMD difficult in some cases. Accordingly, the present disclosure proposes a new and improved information processing device which is mounted on the head of the human body and which is capable of maintaining usability regardless of the attachment direction.

Solution to Problem

According to the present disclosure, there is provided an information processing device mounted on a head of a human body, including: an operation detection unit that detects an operation performed with respect to the information processing device; and a control unit that, on a basis of an attitude of the information processing device, decides an action to be conducted in correspondence with an operation detected by the operation detection unit.

Advantageous Effects of Invention

According to the present disclosure as described above, there is provided an information processing device which is mounted on the head of the human body and which is capable of maintaining usability regardless of the attachment direction. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
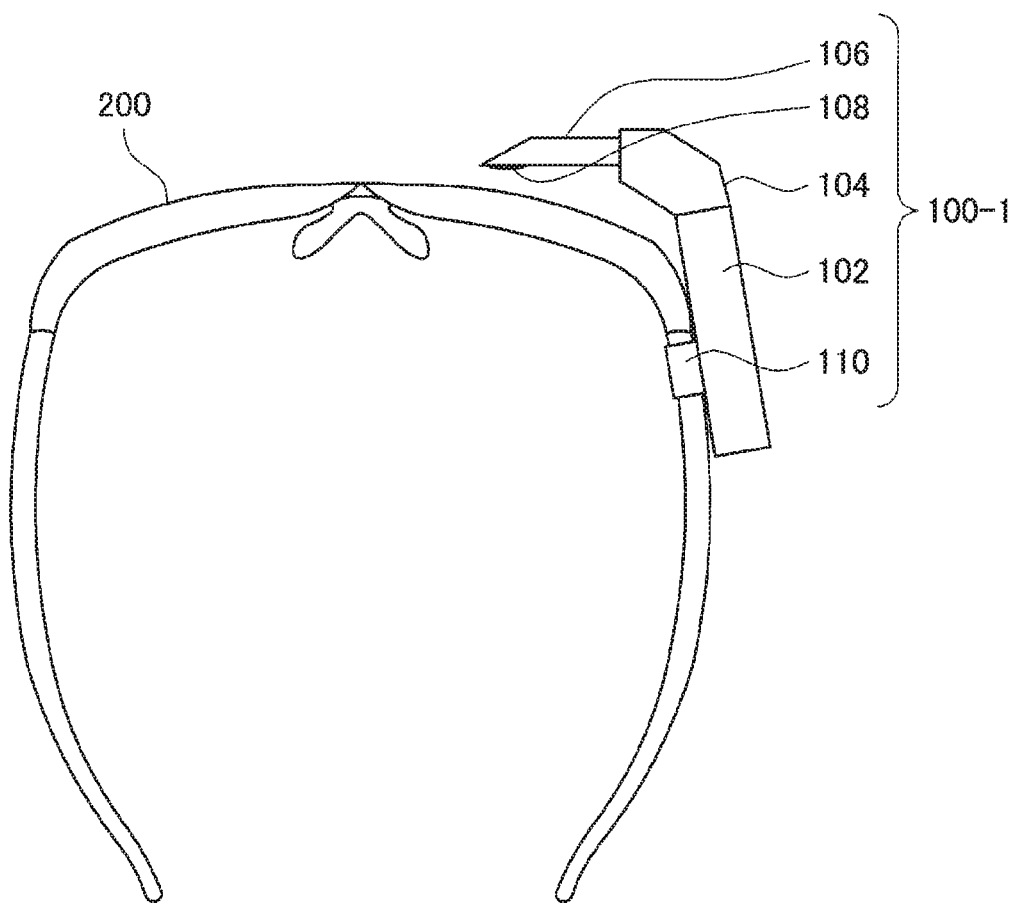
FIG. 1 is a top view illustrating an example of a diagrammatic physical configuration of an information processing device and a pair of eyeglasses according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Hereinafter, the description will proceed in the following order.

1. Problems of information processing device according to related art
2. First embodiment (example of assignment control of action corresponding to operation)
3. Second embodiment (example of display mode control of display image)
4. Hardware configuration of information processing device according to embodiment of present disclosure
5. Conclusion <1. Problems of Information Processing Device According to Related Art>

First, problems in a head-mounted information processing device of the related art will be described.

The head-mounted information processing device (hereinafter also called an HMD) of the related art is provided with an image display function and an operation function. Specifically, as the image display function, the HMD of the related art projects an image onto a separately provided display screen, or emits image light directly towards the user's eye through a lens, causing the user to recognize the image as a virtual image. Also, as the operation function, the HMD of the related art includes an operation unit that accepts user operations. For this reason, the HMD of the related art is capable of actions such as displaying an image selected by a user operation performed on the operation unit.

At this point, the HMD of the related art is typically designed under the assumption that the HMD is mounted in a predetermined direction. For example, in the case of a monocular HMD, the HMD is designed under the assumption that the HMD is attached to one of the user's eyes. For this reason, if the HMD is mounted in a direction different from the predetermined one, the position of the operation unit becomes a position not anticipated by the design, and the operability of the HMD may be lowered.

Accordingly, the present disclosure proposes an information processing device which is mounted on the head of the human body and which is capable of maintaining usability regardless of the attachment direction. Hereinafter, such an information processing device will be described in detail. Note that, for the sake of convenience, respective devices such as the information processing devices 100 according to the first and second embodiments will be distinguished by appending a number corresponding to the embodiment, such as the information processing device 100-1 and the information processing device 100-2.

<2. First Embodiment (Example of Assignment Control of Action Corresponding to Operation)>

The above thus describes problems of the information processing device according to the related art. Next, an information processing device 100-1 according to a first embodiment of the present disclosure will be described. In the present embodiment, the information processing device 100-1 controls the assignment of an action conducted in correspondence with an operation on the basis of the attitude of the information processing device 100-1.

<2-1. Configuration of Device>

(Physical Configuration of Device)

First, a physical configuration of the information processing device 100-1 and a pair of eyeglasses 200 will be described with reference to FIGS. 1 and 2. FIG. 1 is a top view illustrating an example of a diagrammatic physical configuration of the information processing device 100-1 and the eyeglasses 200 according to the first embodiment of the present disclosure, while FIG. 2 is a perspective view illustrating an example of a diagrammatic physical configuration of the information processing device 100-1 and the eyeglasses 200 according to the present embodiment.

Figure 2:
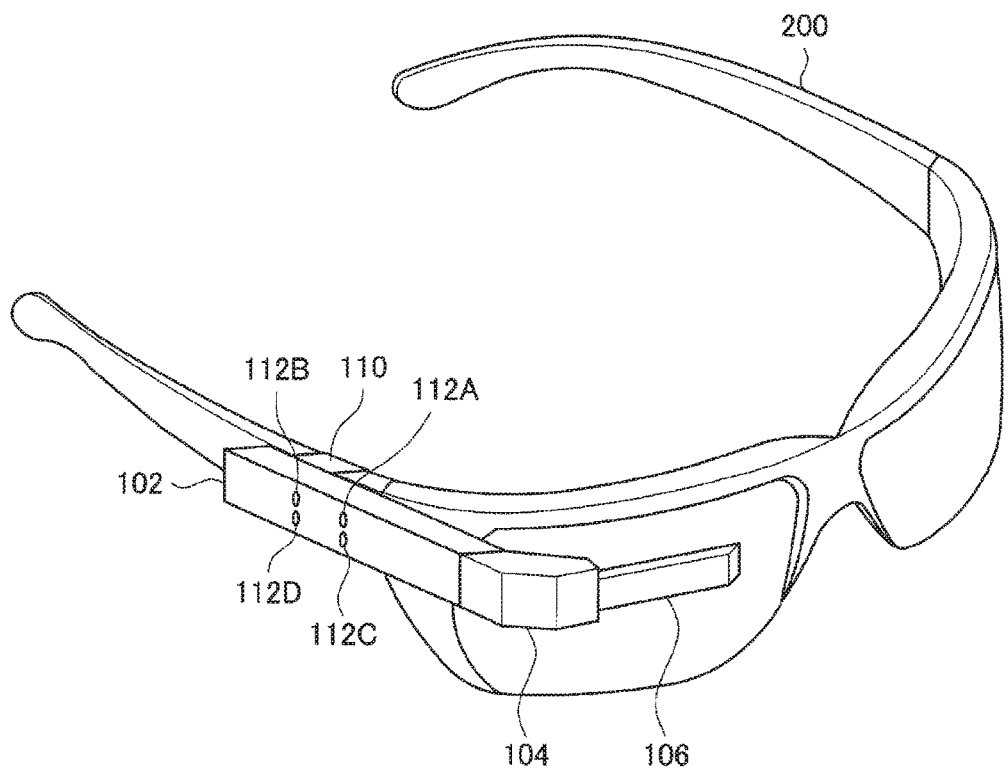
FIG. 2 is a perspective view illustrating an example of a diagrammatic physical configuration of an information processing device and a pair of eyeglasses according to the present embodiment.

As illustrated in FIGS. 1 and 2, the information processing device 100-1 is provided with a main unit 102, an arm 104, a lens barrel 106, an eyepiece lens 108, an attachment unit 110, and an operation unit 112.

The main unit 102 is connected to the arm 104 and the eyeglasses 200. Specifically, the lengthwise edge of the main unit 102 is joined to the arm 104, and one side face of the main unit 102 is attached to the eyeglasses 200 via the attachment unit 110. For example, as illustrated in FIG. 1, the main unit 102 is attached along the frame of the eyeglasses 200. Note that the main unit 102 may be provided with the operation unit 112 as illustrated in FIG. 2.

In addition, the main unit 102 includes a built-in control board for controlling the actions of the information processing device 100-1. Specifically, the main unit 102 includes a control board including components such as a central processing unit (CPU) and random access memory (RAM), and is connected to the lens barrel 106 via the arm 104 using signal wires or the like.

In addition, the main unit 102 includes a built-in sensor for specifying the attitude of the information processing device 100-1. Specifically, the main unit 102 includes a built-in acceleration sensor. Note that, instead of an acceleration sensor, the main unit 102 may also be provided with an angular velocity sensor, a geomagnetic sensor, or a camera sensor. For example, the attitude of the information processing device 100-1 may be estimated from an image obtained by the camera sensor. Furthermore, instead of a sensor, the main unit 102 may also be provided with a communication unit that receives, from an external device, information enabling the main unit 102 to specify the attitude of the information processing device 100-1.

The arm 104 connects the main unit 102 and the lens barrel 106, and supports the lens barrel 106. Specifically, the arm 104 is respectively joined to one end of the main unit 102 and one end of the lens barrel 106, and secure the lens barrel 106. Also, the arm 104 includes built-in signal wires for communicating image-related data provided from the main unit 102 to the lens barrel 106.

The lens barrel 106 projects projected image light onto the eyepiece lens. Specifically, the lens barrel 106 includes a projection unit, a light guide unit, and a reflection unit, in which the projection unit projects image light towards the light guide unit, the light guide unit guides the incident image light to the reflection unit, and the reflection unit reflects the arriving image light towards the eyepiece lens. Note that the image according to the projected image light is provided from the main unit 102 via the arm 104.

The eyepiece lens 108 magnifies the image. Specifically, the eyepiece lens refracts the image light emitted from the lens barrel 106 to magnify the image according to the image light.

The attachment unit 110 secures the main unit 102 to the eyeglasses 200. Specifically, the attachment unit 110 secures one side face of the main unit 102 to the frame of the eyeglasses 200.

The operation unit 112 accepts user operations with respect to the information processing device 100-1. Specifically, the operation unit 112 converts user operations into input for the information processing device 100-1. For example, as illustrated in FIG. 2, the operation unit 112 may be provided plurally on a side face of the main unit 102, and may be arranged in the horizontal direction and the vertical direction. Note that although FIG. 2 illustrates operation units 112A to 112D like push-buttons, the operation unit 112 is not limited thereto, and may be any of various forms. For example, the operation unit 112 may also be an input device such as a touchpad.

(Functional Configuration of Device)

Figure 3:
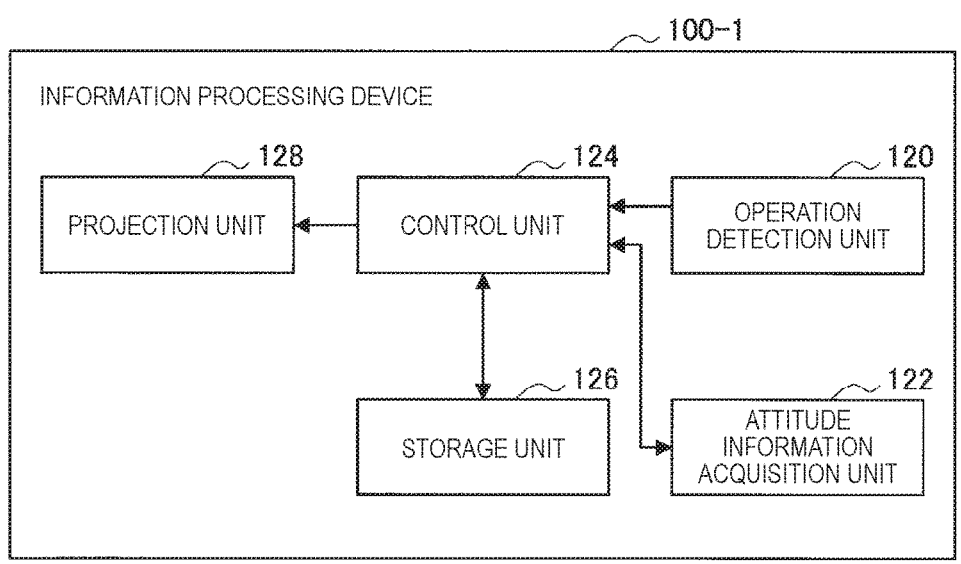
FIG. 3 is a block diagram illustrating an example of a schematic functional configuration of an image processing device according to the present embodiment.

Next, a functional configuration of the information processing device 100-1 will be described with reference to FIG. 3. FIG. 3 is a block diagram illustrating an example of a schematic functional configuration of the image processing device 100-1 according to the present embodiment.

As illustrated in FIG. 3, the information processing device 100-1 is provided with an operation detection unit 120, an attitude information acquisition unit 122, a control unit 124, a storage unit 126, and a projection unit 128.

The operation detection unit 120 detects user operations performed on the information processing device 100-1. Specifically, the operation detection unit 120 receives input converted by the operation unit 112, and detects a performed user operation on the basis of the received input. Subsequently, the operation detection unit 120 generates information indicating the detected user operation (hereinafter also called user operation information), and provides the generated user operation information to the control unit 124.

The attitude information acquisition unit 122 acquires information related to the attitude of the information processing device 100-1. Specifically, the attitude information acquisition unit 122 acquires information that changes in accordance with an inversion of the attitude of the information processing device 100-1. For example, the attitude information acquisition unit 122 acquires information indicating the acceleration of the information processing device 100-1 (hereinafter also called acceleration information) from an acceleration sensor. Note that the attitude information acquisition unit 122 provides the acquired acceleration information to the control unit 124.

The control unit 124 controls the overall action of the information processing device 100-1. Specifically, the control unit 124 controls the execution of actions corresponding to user operations, the display of images, and the like. For example, the control unit 124 causes the respective structural elements of the information processing device 100-1 to execute an action corresponding to a user operation detected by the operation detection unit 120. Also, the control unit 124 decides an image to project, on the basis of such a user operation.

Furthermore, on the basis of the attitude of the information processing device 100-1, the control unit 124 decides an action conducted in correspondence with an operation detected by the operation detection unit 120 (hereinafter also called the action deciding process). Specifically, the control unit 124 conducts the action deciding process on the basis of information that changes in accordance with an inversion of the attitude of the information processing device 100-1 acquired by the attitude information acquisition unit 122.

Figure 4A:
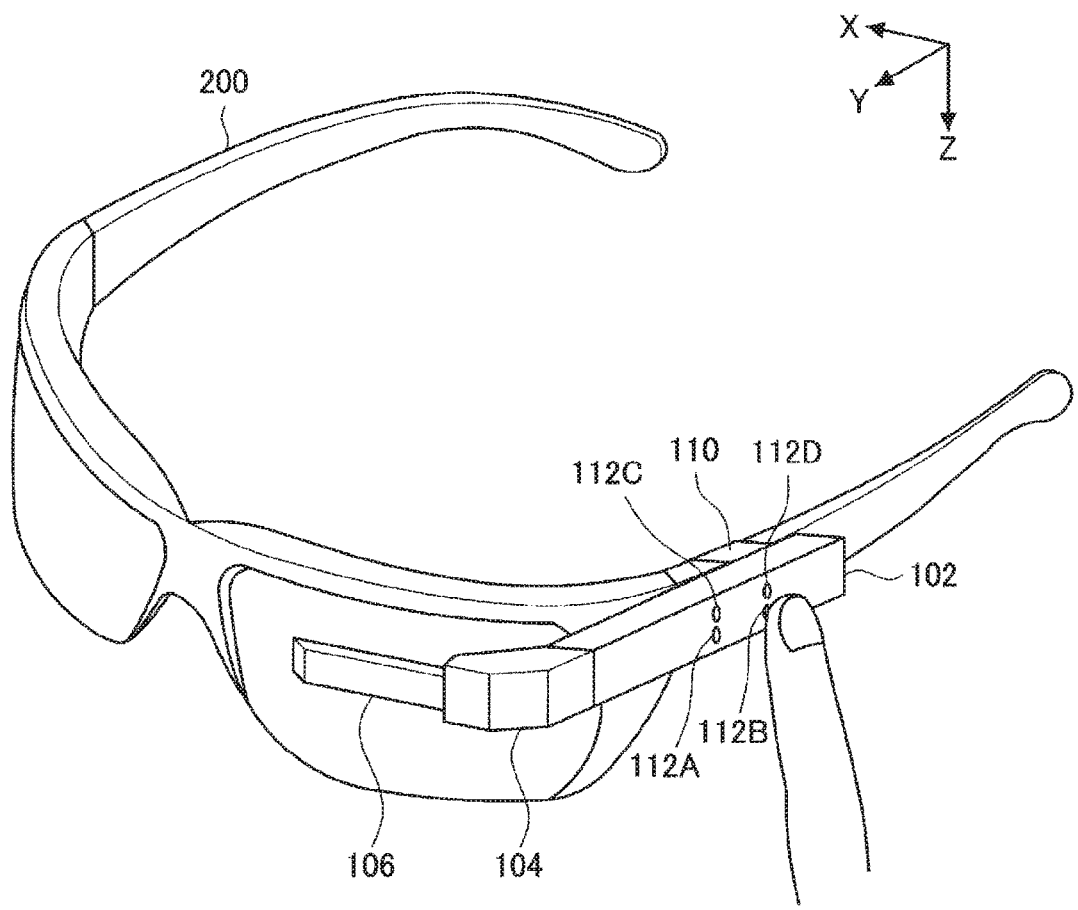
FIG. 4A is a diagram illustrating an example of a case in which an information processing device according to the present embodiment is attached to the left frame of a pair of eyeglasses.
Figure 4B:
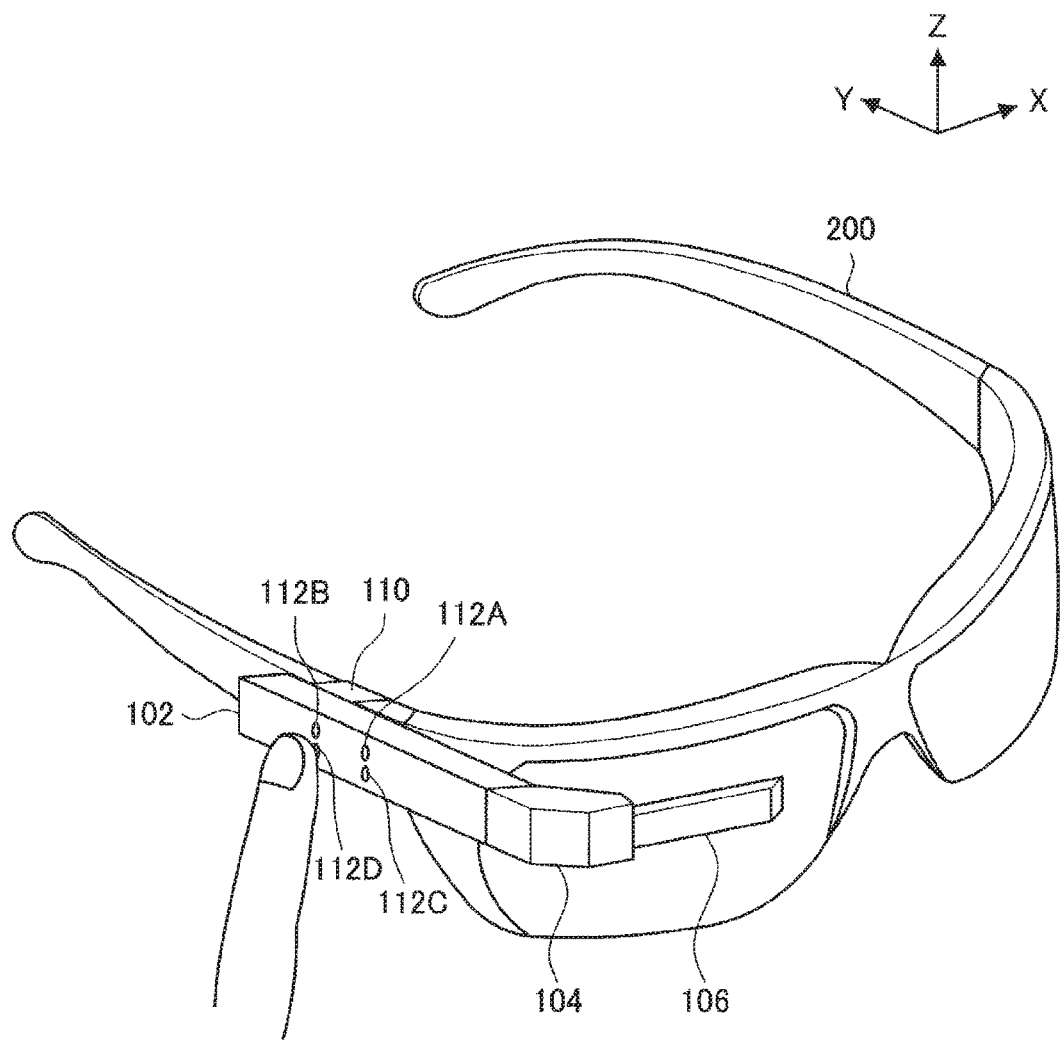
FIG. 4B is a diagram illustrating an example of a case in which an information processing device according to the present embodiment is attached to the right frame of a pair of eyeglasses.

More specifically, the control unit 124 conducts the action deciding process in accordance with the direction of gravitational acceleration included in the acceleration information acquired by the attitude information acquisition unit 122, with respect to a reference direction. Additionally, the action deciding process will be described in further detail with reference to FIGS. 4A and 4B. FIG. 4A is a diagram illustrating an example of a case in which the information processing device 100-1 according to the present embodiment is attached to the left frame of the eyeglasses 200, while FIG. 4B is a diagram illustrating an example of case in which the information processing device 100-1 according to the present embodiment is attached to the right frame of the eyeglasses 200.

First, the control unit 124 detects the value of the gravitational acceleration in the reference direction. For example, the reference direction is the Z-axis direction as illustrated in FIG. 4A, and the control unit 124 detects the value of the gravitational acceleration in the Z-axis direction.

Next, the control unit 124 reorganizes the correspondence relationship between each user operation to be detected and each action, in accordance with the sign of the detected value of the gravitational acceleration. Specifically, the control unit 124 reorganizes the correspondence relationship for positions related to operations associated with actions so that the associated actions are inverted vertically and horizontally.

Figure 9:
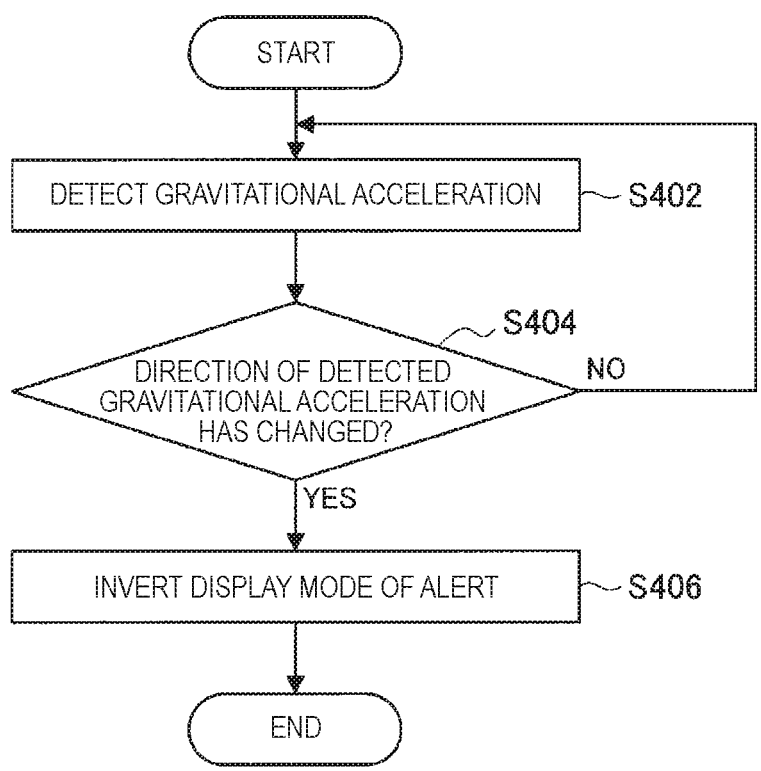
FIG. 9 is a flowchart that conceptually illustrates a process by an information processing device according to the present embodiment.

For example, when the information processing device 100-1 is mounted as illustrated in FIG. 4A, 9.8 m/s$^2$ is detected as the value of the gravitational acceleration, for example. When a positive value of gravitational acceleration is detected, the control unit 124 may respectively assign, for example, Action 1, Action 2, Action 3, and Action 4 to each of respective user operations detected by the operation detection unit 120 which are performed respectively on each of the operation units 112A to 112D (hereinafter also called user operations on the operation units 112A to 112D), for example, in accordance with a certain correspondence relationship stored in the storage unit 126.

Meanwhile, when the information processing device 100-1 is mounted as illustrated in FIG. 4B, −9.8 m/s$^2$ is detected as the value of the gravitational acceleration, for example. When a negative value of gravitational acceleration is detected, the control unit 124 respectively assigns, for example, Action 3, Action 4, Action 1, and Action 2 to each of the respective user operations on the operation units 112A to 112D, for example, in accordance with another correspondence relationship stored in the storage unit 126.

Returning to the description of the configuration of the information processing device 100-1 with reference to FIG. 3, the storage unit 126 stores information related to the control by the control unit 124. Specifically, the storage unit 126 stores information indicating a correspondence relationship between operations and actions, as well as images to be projected.

The projection unit 128 projects image light. Specifically, the projection unit 128 projects image light corresponding to an image stored in the storage unit 126, on the basis of an instruction from the control unit 124. Note that an image corresponding to image light to be projected may also be acquired from an external device via communication, and may also be altered by the control unit 124.

<2-2. Process by Device>

Figure 5:
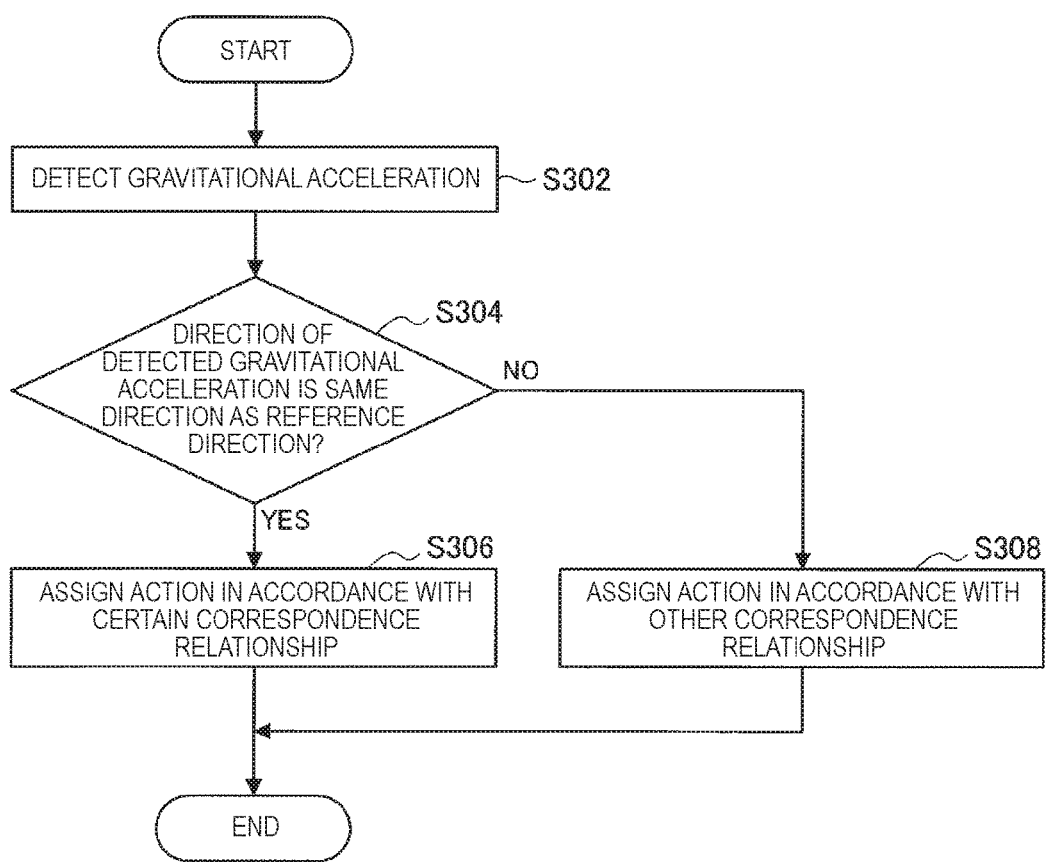
FIG. 5 is a flowchart that conceptually illustrates a process by an information processing device according to the present embodiment.

Next, a process by the information processing device 100-1 according to the present embodiment will be described with reference to FIG. 5. FIG. 5 is a flowchart that conceptually illustrates a process by the information processing device 100-1 according to the present embodiment.

First, the information processing device 100-1 detects the gravitational acceleration (step S302). Specifically, the attitude information acquisition unit 122 acquires acceleration information from an acceleration sensor, and the control unit 124 detects the value of the gravitational acceleration on the basis of the acquired acceleration information and the reference direction.

Next, the information processing device 100-1 determines whether or not the direction of the detected gravitational acceleration is the same direction as the reference direction (step S304). Specifically, the control unit 124 determines whether the detected value of the gravitational acceleration is a certain value, such as 9.8 m/s$^2$ or −9.8 m/s$^2$, for example. Note that the control unit 124 may also determine the sign of the detected value of the gravitational acceleration.

If the direction of the gravitational acceleration is determined to be the same direction as the reference direction, the information processing device 100-1 assigns actions in accordance with a certain correspondence relationship (step S306). Specifically, if the detected value of the gravitational acceleration is determined to be 9.8 m/s$^2$, for example, the control unit 124 assigns actions to operations in accordance with a certain correspondence relationship between operations and actions stored in the storage unit 126.

If the direction of the gravitational acceleration is determined to be different from the reference direction, the information processing device 100-1 assigns actions in accordance with another correspondence relationship (step S308). Specifically, if the detected value of the gravitational acceleration is determined to be −9.8 m/s$^2$, for example, the control unit 124 assigns actions to operations in accordance with a correspondence relationship between operations and actions stored in the storage unit 126 which is different from the case when the value of the gravitational acceleration is 9.8 m/s$^2$.

In this way, according to the first embodiment of the present disclosure, the information processing device 100-1 detects an operation performed with respect to the information processing device 100-1, and on the basis of the attitude of the information processing device 100-1, decides an action to be conducted in correspondence with the detected operation. For this reason, the operations that the user is to perform in order to obtain a desired action result may be normalized in accordance with the attitude, or in other words the attachment direction, of the information processing device 100-1, thereby making it possible to maintain the usability of the information processing device 100-1 regardless of the attachment direction, without having the user perform work such as changing settings.

Also, the information processing device 100-1 acquires information that changes in accordance with an inversion of the attitude of the information processing device 100-1, and makes the above decision about actions on the basis of the acquired information that changes in accordance with such an inversion. Generally, if the attitude of an object is inverted, the operability of the object often changes, but according to the present embodiment, since the assignment of actions to operations is decided in accordance with the inversion of the attitude of the information processing device 100-1, it is possible to minimized reductions in operability.

Also, the above information that changes in accordance with an inversion includes information indicating the gravitational acceleration, and the information processing device 100-1 makes the above decision about actions on the basis of the direction of the gravitational acceleration with respect to a reference direction. For this reason, by using an existing facility to detect an inversion of the attitude of the information processing device 100-1, such as an acceleration sensor, for example, it becomes possible to minimize cost increases and increased complexity of the information processing device 100-1.

Also, as the above decision about actions, the information processing device 100-1 reorganizes the correspondence relationship between each operation and each action. For this reason, by not newly adding or removing actions corresponding to operations, the user is able to grasp the details of the change in the correspondence relationship easily, thereby making it possible to maintain usability for the user.

Also, the information processing device 100-1 reorganizes the above correspondence relationship for positions related to operations associated with actions so that the associated actions are inverted vertically and horizontally. For this reason, the assignment of actions to operations is made to conform to the user's intuitive expectations of operation both before and after the attachment direction of the information processing device 100-1 is inverted, thereby making it possible to maintain and improve operability.

<2-3. Modifications>

The foregoing thus describes a first embodiment of the present disclosure. However, the present embodiment is not limited to the foregoing example. Hereinafter, modifications of the present embodiment will be described.

Figure 6:
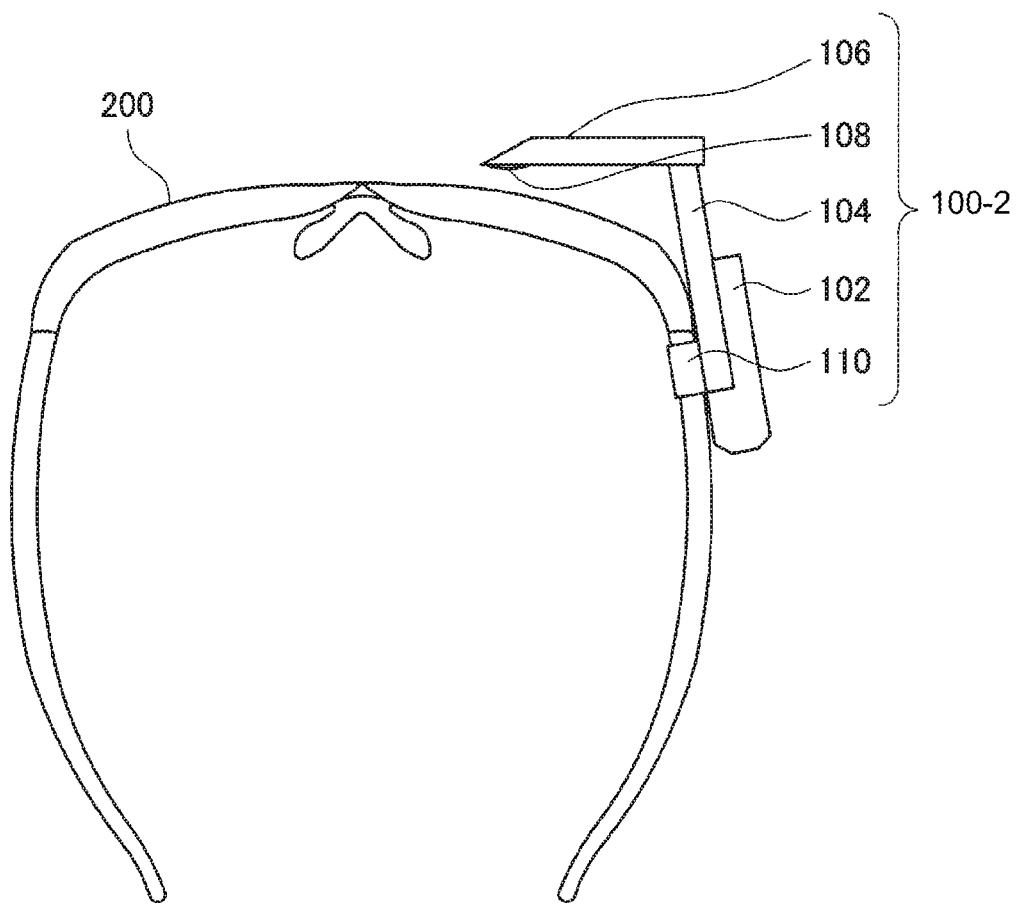
FIG. 6 is a top view illustrating an example of a diagrammatic physical configuration of an information processing device and a pair of eyeglasses according to a modification of the present embodiment.
Figure 7:
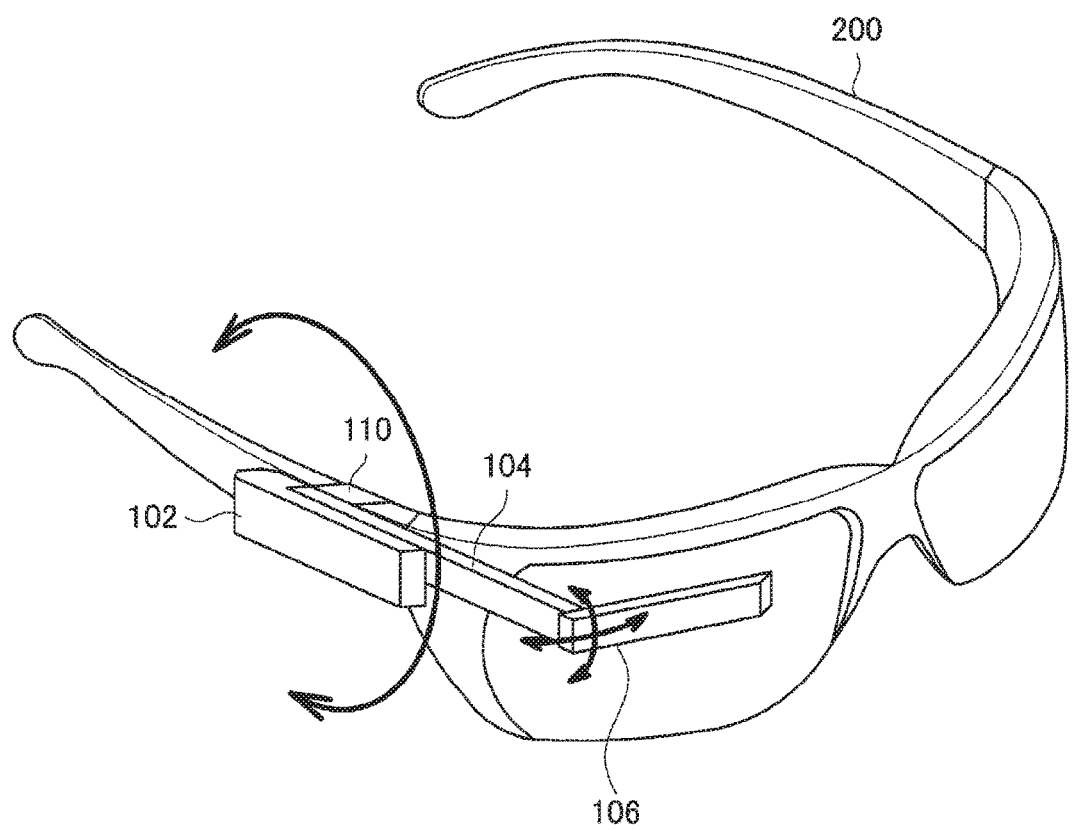
FIG. 7 is a perspective view illustrating an example of a diagrammatic physical configuration of an information processing device and a pair of eyeglasses according to a modification of the present embodiment.

As a modification of the present embodiment, the information processing device 100-1 may also include a mechanism enabling adjustment of the image display position. Specifically, the lens barrel 106 and the arm 104 are joined while retaining movability. A configuration of the information processing device 100-1 according to the present modification will be described with reference to FIGS. 6 and 7. FIG. 6 is a top view illustrating an example of a diagrammatic physical configuration of the information processing device 100-1 and the eyeglasses 200 according to a modification of the present embodiment, while FIG. 7 is a perspective view illustrating an example of a diagrammatic physical configuration of the information processing device 100-1 and the eyeglasses 200 according to a modification of the present embodiment.

The lens barrel 106 is joined to the arm 104 so as to allow rotation about the horizontal direction and the vertical direction as axes, at the position of the joining with the arm 104. For example, as illustrated in FIG. 7, the lens barrel 106 is joined to the arm 104 so as to allow rotation by a certain angle in the directions of the arrows at the position of the joining between the lens barrel 106 and the arm 104. For example, the lens barrel 106 may rotate from a reference position by approximately −5 degrees to 5 degrees about the long-edge direction as the axis, and by approximately −10 degrees to 10 degrees about the short-edge direction as the axis.

Also, the display position may be adjusted by rotating the arm 104. Specifically, the arm 104 is joined to the main unit 102 so as to allow rotation about the horizontal direction as an axis, at the position of the joining with the arm 104. For example, as illustrated in FIG. 7, the arm 104 is joined to the main unit 102 so as to allow rotation by a certain angle in the directions of the arrows about the short-edge direction of the arm 104 as the axis, at the position of the joining between the arm 104 and the main unit 102.

In this way, according to a modification of the present embodiment, the lens barrel 106 and the arm 104, as well as the arm 104 and the main unit 104, are joined while retaining movability. For this reason, it becomes possible to absorb individual differences as a result of the image display position being changed by adjusting the position of each unit. Additionally, fine adjustment becomes possible by adjusting the positions of both the lens barrel 106 and the arm 104, and usability for the user may be improved.

<3. Second Embodiment (Example of Display Mode Control of Display Image)>

The above thus describes the information processing device 100-1 according to the first embodiment of the present disclosure. Next, an information processing device 100-2 according to a second embodiment of the present disclosure will be described. In the present embodiment, the information processing device 100-2 inverts the display mode of an alert image or the like in accordance with the attitude of the information processing device 100-2.

<3-1. Configuration of Device>

First, a configuration of the information processing device 100-2 will be described. Note that description will be reduced or omitted for parts of the configuration which are substantially the same as the configuration of the first embodiment.

(Functional Configuration of Device)

The control unit 124 conducts image display inversion control, on the basis of the attitude of the information processing device 100-2. Specifically, when the attitude of the information processing device 100-2 is inverted, the control unit 124 controls the display so that the display screen is inverted vertically. For example, when the direction of gravitational acceleration detected from the acceleration information acquired by the attitude information acquisition unit 122 changes, the control unit 124 causes the projection unit 128 to project image light corresponding to a vertically inverted image.

Figure 8A:
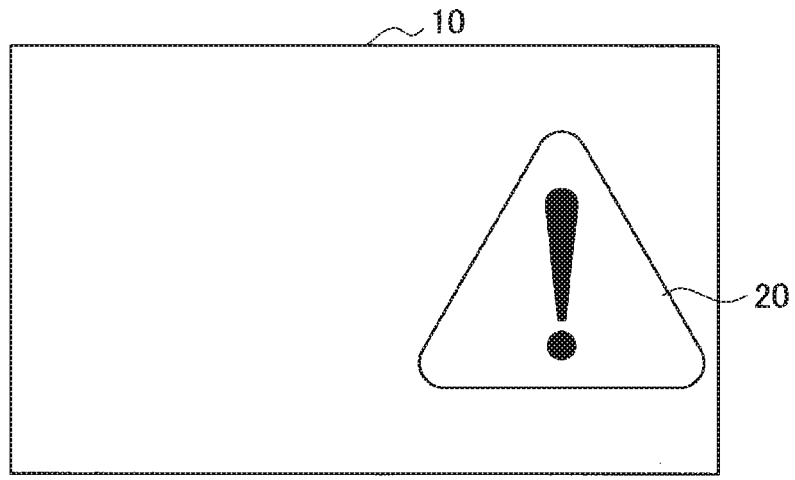
FIG. 8A is a diagram illustrating an example of inversion control of the display position of a specific image in an information processing device according to a second embodiment of the present disclosure.
Figure 8B:
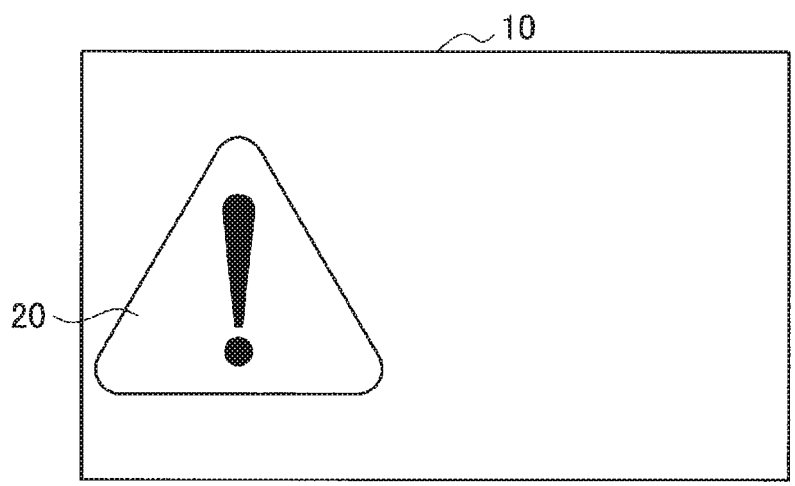
FIG. 8B is a diagram illustrating an example of inversion control of the display position of a specific image in an information processing device according to the present embodiment.

In addition, the control unit 124 acts as a display control unit, and on the basis of the attitude of the information processing device 100-2, inverts the display mode of a specific image having a higher display priority than other images, using as an axis a vertical direction on the display screen on which the specific image is displayed. Specifically, the control unit 124 inverts the display position of the specific image using the vertical direction of the display screen as an axis. Additionally, the display control process will be described in further detail with reference to FIGS. 8A and 8B. FIGS. 8A and 8B are diagrams illustrating an example of inversion control of the display position of a specific image in the information processing device 100-2 according to the present embodiment.

First, the control unit 124 issues an instruction to display a specific image. Specifically, the control unit 124 causes a specific image to be displayed at a position closer to the center of the field of view of the user wearing the information processing device 100-2 than another position on the display screen. For example, the control unit 124 causes a specific image, such as an image 20 for arousing the user's attention as illustrated in FIG. 8A (hereinafter also called an alert image), for example, on the display screen 10. For example, the alert image 20 is displayed at a position adjacent to the user's nose in the state in which the information processing device 100-2 is mounted on the user's head.

Subsequently, if the attitude of the information processing device 100-2 is inverted, the control unit 124 inverts the display position of the specific image, using the vertical direction of the display screen as an axis. For example, the control unit 124 determines whether or not the direction of gravitational acceleration has changed on the basis of the acceleration information, and in the case of determining that the direction of the gravitational acceleration has changed, the control unit 124 inverts the display position of the alert image 20 using the vertical direction in the center of the display screen 10 as an axis, as illustrated in FIG. 8B.

Note that the control unit 124 may also display the alert image 20 at a position corresponding to the value of the gravitational acceleration. For example, if the value of the gravitational acceleration is 9.8 m/s$^2$, the control unit 124 displays the alert image 20 at a position adjacent to the center of the user's field of view as illustrated in FIG. 8A. Additionally, the alert image 20 may also be displayed at a position corresponding to the sign of the gravitational acceleration.

<3-2. Process by Device>

Next, a process by the information processing device 100-2 according to the present embodiment will be described with reference to FIG. 9. FIG. 9 is a flowchart that conceptually illustrates a process by the information processing device 100-2 according to the present embodiment. Note that description will be reduced or omitted for processes which are substantially the same as processes in the first embodiment.

First, the information processing device 100-2 detects the gravitational acceleration (step S402), and determines whether or not the direction of the detected gravitational acceleration has changed (step S404). Specifically, the control unit 124 determines whether or not the sign of the detected value of the gravitational acceleration has changed.

If it is determined that the direction of the gravitational acceleration has changed, the information processing device 100-2 inverts the display mode of the specific image (step S406). Specifically, if it is determined that the sign of the detected value of the gravitational acceleration has changed, the control unit 124 inverts the display position of the alert image using the vertical direction in the center of the display screen as an axis.

In this way, according to the second embodiment of the present disclosure, on the basis of an inversion of the attitude of the information processing device 100-2, the information processing device 100-2 inverts the display mode of a specific image having a higher display priority than other images, using as an axis a vertical direction on the display screen on which the specific image is displayed. For this reason, the display mode of an image that is important for the user may be normalized in correspondence with a change in the attitude of the information processing device 100-2, thereby making it possible to maintain and improve usability for the user, without having the user perform work such as changing settings.

In addition, the information processing device 100-2 inverts the display position of the specific image using the vertical direction in the center of the display screen as an axis. For this reason, there is no change in the distance from the center of the user's field of view to the display position of the specific image before and after the inversion of the attitude of the information processing device 100-2, thereby making it possible to minimize the occurrence of user discomfort with respect to the display image due to a change in the attachment direction of the information processing device 100-2.

In addition, the above display position of the specific image includes a position closer to the center of the field of view of the user wearing the information processing device 100-2 than another position on the display screen. For this reason, the display of the specific image is maintained at a position easy for the user to spot, thereby making it possible to minimize overlooking of the specific image by the user.

In addition, the above specific image includes an image for arousing the user's attention. For this reason, even if the attachment direction of the information processing device 100-2 changes, it is possible to minimize drops in the user's attentiveness.

<3-3. Modifications>

The foregoing thus describes the second embodiment of the present disclosure. However, the present embodiment is not limited to the foregoing example. Hereinafter, modifications of the present embodiment will be described.

Figure 10A:
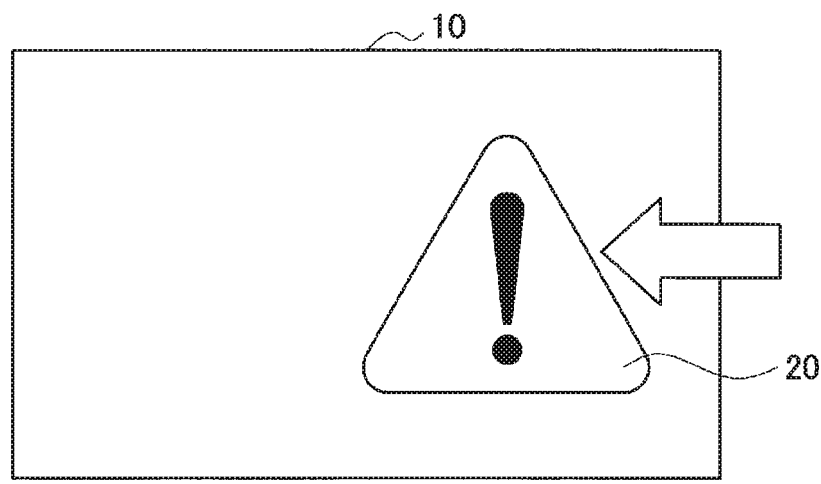
FIG. 10A is a diagram illustrating an example of inversion control of the insertion direction of a specific image in an information processing device according to a modification of the present embodiment.
Figure 10B:
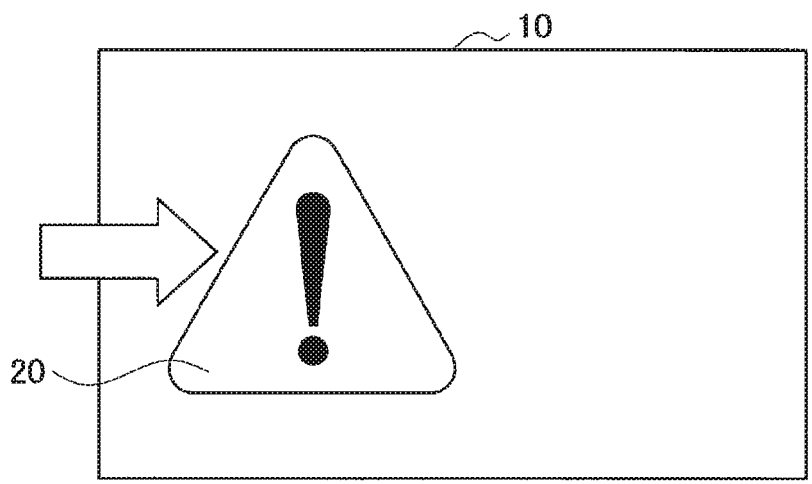
FIG. 10B is a diagram illustrating an example of inversion control of the insertion direction of a specific image in an information processing device according to a modification of the present embodiment.

As a modification of the present embodiment, the information processing device 100-2 may also change the insertion direction of the specific image into the display screen, in accordance with the attitude of the information processing device 100-2. Specifically, if the attitude of the information processing device 100-2 is inverted, the control unit 124 inverts the insertion direction of the specific image into the display screen, using the vertical direction of the display screen as an axis. In addition, a process according to the present modification will be described in further detail with reference to FIGS. 10A and 10B. FIGS. 10A and 10B are diagrams illustrating an example of inversion control of the insertion direction of a specific image in the information processing device 100-2 according to a modification of the present embodiment.

First, the control unit 124 issues an instruction to insert a specific image into the display screen for display. Specifically, the control unit 124 inserts the specific image in a direction proceeding from the outside to the inside of the field of view of the user wearing the information processing device 100-2. For example, the control unit 124 displays a specific image, such as the alert image 20 as illustrated in FIG. 10A, for example, moving from the left side to the right side of the display screen 10, or in other words, from the outside towards the center of the user's field of view.

Subsequently, if the attitude of the information processing device 100-2 is inverted, the control unit 124 inverts the display position of the specific image, using the vertical direction of the display screen as an axis. For example, the control unit 124 determines whether or not the direction of gravitational acceleration has changed on the basis of the acceleration information, and in the case of determining that the direction of the gravitational acceleration has changed, the control unit 124 inverts the insertion direction of the image 20 using the vertical direction on the display screen 10 as an axis, as illustrated in FIG. 10B.

Note that, similarly to the control of the display position of the specific image, the control unit 124 may also insert the alert image 20 from a direction corresponding to the value of the gravitational acceleration, or insert the alert image 20 from a direction corresponding to the sign of the gravitational acceleration.

In this way, according to a modification of the present embodiment, the information processing device 100-2 inverts the insertion direction of a specific image into the display screen using the vertical direction in the center of the display screen as an axis. For this reason, even if the attachment direction of the information processing device 100-2 is changed, by giving the user an impression that the insertion direction of the specific image has not changed, it becomes possible to minimize the occurrence of user discomfort.

In addition, the above insertion direction of the specific image includes a direction proceeding from the outside to the inside of the field of view of the user wearing the information processing device 100-2. For this reason, by imparting to the user a sense of information entering the user's head, it becomes possible for the user to read the information indicated by the specific image without discomfort.

<4. Hardware Configuration of Information Processing Device According to Embodiment of Present Disclosure>

The foregoing thus describes an information processing device 100 according to embodiments of the present disclosure. Processes by the information processing device 100 described above are realized by cooperative action between software, and the hardware of the information processing device 100 described below.

Figure 11:
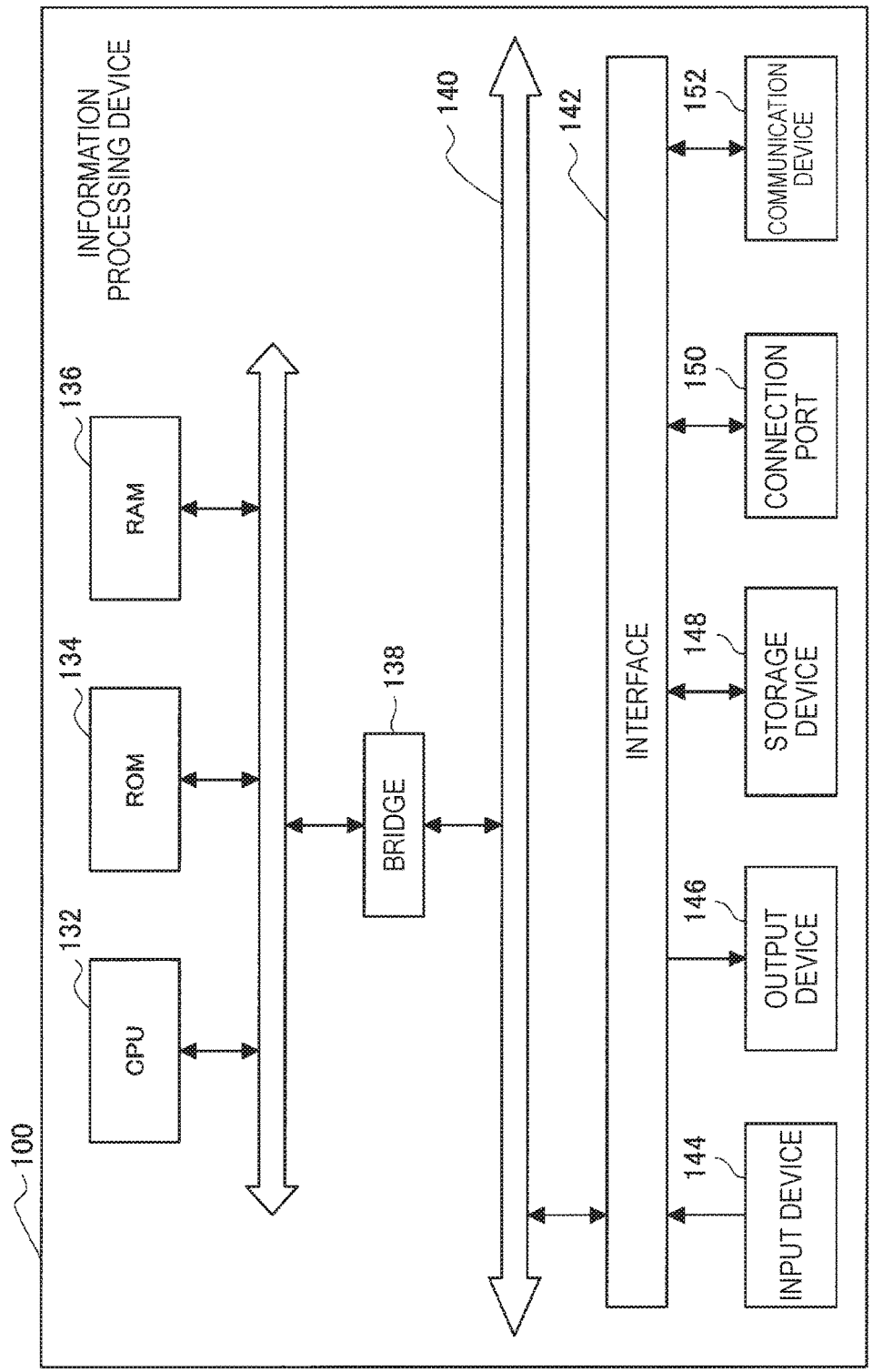
FIG. 11 is an explanatory diagram illustrating a hardware configuration of an information processing device according to the present disclosure.

FIG. 11 is an explanatory diagram illustrating a hardware configuration of the information processing device 100 according to the present disclosure. As illustrated in FIG. 11, the information processing device 100 is equipped with a central processing unit (CPU) 132, read-only memory (ROM) 134, random access memory (RAM) 136, a bridge 138, a bus 140, an interface 142, an input device 144, an output device 146, a storage device 148, a connection port 150, and a communication device 152.

The CPU 132 functions as a computational processing device and control device, and cooperates with various programs to realize the action of the operation detection unit 120 and the control unit 124 inside the information processing device 100. Also, the CPU 132 may be a microprocessor. The ROM 134 stores information such as programs or computational parameters used by the CPU 132. The RAM 136 temporarily stores information such as programs used during execution by the CPU 132, or parameters that change as appropriate during such execution. Part of the storage unit 126 inside the information processing device 100 is realized by the ROM 134 and the RAM 136. The CPU 132, the ROM 134, and the RAM 136 are interconnected by an internal bus made up of a CPU bus or the like.

The input device 144 is an example of the operation unit 112 of the information processing device 100, and is made up of an input means by which a user inputs information, such as a mouse, a keyboard, a touch panel, a button, a microphone, a switch, or a lever, and an input control circuit that generates an input signal on the basis of input from the user, and outputs to the CPU 132, for example. By operating the input device 144, the user of the information processing device 100 is able to input various data and instruct the information processing device 100 to perform processing actions, for example.

The output device 146 outputs to a device such as a liquid crystal display (LCD) device, an organic light-emitting diode (OLED) device, or a lamp, for example. Furthermore, the output device 146 may also output sound from a device such as a speaker or headphones.

The storage device 148 is a device used to store data. The storage device 148 may include a storage medium, a recording device that records data to the storage medium, a readout device that reads out data from the storage medium, a deletion device that deletes data recorded to the storage medium, and the like. The storage device 148 stores programs executed by the CPU 132 and various data.

The connection port 150 is a bus for connecting devices or peripheral equipment external to the information processing device 100, for example. Also, the connection port 150 may be a Universal Serial Bus (USB) port.

The communication device 152 is a communication interface made up of a communication device that connects to a network, for example. Also, the communication device 152 may be a communication device supporting wireless local area network (LAN), or a communication device supporting Long Term Evolution (LTE).

<5. Conclusion>

As above, according to the first embodiment of the present disclosure, the operations that the user is to perform in order to obtain a desired action result may be normalized in accordance with the attitude, or in other words the attachment direction, of the information processing device 100-1, thereby making it possible to maintain the usability of the information processing device 100-1 regardless of the attachment direction, without having the user perform work such as changing settings. Also, according to the second embodiment of the present disclosure, the display mode of an image that is important for the user may be normalized in correspondence with a change in the attitude of the information processing device 100-2, thereby making it possible to maintain and improve usability for the user, without having the user perform work such as changing settings.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the foregoing embodiments describe an example in which the acceleration sensor is provided in the main unit 102, but the present technology is not limited to such an example. Specifically, if the arm 104 is provided so as to allow rotation, the acceleration sensor may also be provided in the lens barrel 106. For example, if the arm 104 is able to rotate approximately 180 degrees, the mounting position for the user may be changed without inverting the information processing device 100 as a whole. In this case, by providing the acceleration sensor in the lens barrel 106, it becomes possible to detect that the mounting position of the information processing device 100 has changed.

In addition, the foregoing embodiments describe an example in which the display method is a method of projecting towards the user's eye, but specifically may be a pupil division see-through method in which the projected width of the image light is smaller than the pupil diameter, a prism method, a hologram method, or some other display method. Also, the display method may also be another method, such as projecting image light onto a display face provided separately from the information processing device 100.

In addition, the foregoing embodiments describe an example in which the information processing device 100 is a monocular HMD, but the information processing device 100 may also be a binocular device.

In addition, the foregoing embodiments describe an example in which the operation unit 112 is provided on the side face opposite from the side face of the main unit 102 that is connected to the attachment unit 110, but the operation unit 112 may also be provided on the top face or the bottom face of the main unit 102. For example, the operation unit 112 may be an input device that includes touch sensors, and may be provided respectively on the top face and the bottom face of the main unit 102. Subsequently, the control unit 124 may decide the respective actions assigned to respective operations performed on the operation unit 112 on the top face and the bottom face, or in other words, reorganize the actions, in accordance with the attitude of the information processing device 100.

In addition, an action may also be assigned to an operation performed using multiple operation units 112. For example, an action of making the screen display go back may be assigned to an operation such as a slide of an operating body performed at the same timing on each of respective operation units 112 such as touch pads provided on the top face and the bottom face. In this case, by performing operations using a combination of operation units 112, it becomes possible to increase the number of operation patterns, or in other words, action patterns.

In addition, the foregoing second embodiment describes an example of the control unit 124 reorganizing the correspondence relationship of actions with respect to operations, but the control unit 124 may also remove already-assigned actions from an existing correspondence relationship, or assign an additional action to an operation by adding a new action.

In addition, the foregoing first embodiment describes an example of the control unit 124 controlling the correspondence relationship between operations and actions in accordance with the value of the gravitational acceleration, but the control unit 124 may also modify such a correspondence relationship in accordance with a change in the direction of the gravitational acceleration, similarly to the foregoing second embodiment.

In addition, the foregoing second embodiment describes an example in which the specific image whose display mode is controlled is the alert image 20, but the specific image may also be an image that presents useful information to the user. Specifically, the specific image may be an image such as a guidance image for guiding the user's motion in a sport, an image indicating information such as the user's status or performance, or an image indicating the external environment. For example, when playing golf, the specific image may be a swing guidance image, a score image, an image indicating the state of the green, or an image indicating the temperature, humidity, and wind direction.

In addition, the foregoing second embodiment describes an example in which the insertion direction goes from the outside to the center of the field of view, but the insertion direction may also be decided in accordance with a type or an attribute of the image to be displayed. For example, an image classified as a text string may always be inserted from the right side, whereas an image classified as a text string with text specifically in the Arabic language may always be inserted from the left side.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device mounted on a head of a human body, including:

an operation detection unit that detects an operation performed with respect to the information processing device; and a control unit that, on a basis of an attitude of the information processing device, decides an action to be conducted in correspondence with an operation detected by the operation detection unit.

(2)

The information processing device according to (1), in which a plurality of the operation and a plurality of the action exist, and as the decision, the control unit reorganizes a correspondence relationship between each of the operations and each of the actions.

(3)

The information processing device according to (2), in which the control unit reorganizes the correspondence relationship for a position related to the operation associated with the action so that the associated action is inverted vertically and horizontally.

(4)

The information processing device according to any one of (1) to (3), further including:

an acquisition unit that acquires information that changes in accordance with an inversion of the attitude of the information processing device, in which the control unit makes the decision on a basis of the information that changes in accordance with an inversion acquired by the acquisition unit.

(5)

The information processing device according to (4), in which the information that changes in accordance with an inversion includes gravity information indicating a gravitational acceleration, and the control unit makes the decision in accordance with a direction of the gravitational acceleration indicated by the gravity information with respect to a reference direction.

(6)

The information processing device according to any one of (1) to (5), further including:

a display control unit that, on a basis of an inversion of the attitude of the information processing device, inverts a display mode of a specific image having a higher display priority than other images, using as an axis a vertical direction on a display screen on which the specific image is displayed.

(7)

The information processing device according to (6), in which the display control unit inverts a display position of the specific image using as an axis a vertical direction in a center of the display screen.

(8)

The information processing device according to (7), in which the display position includes position closer to a center of a field of view of a user wearing the information processing device than another position on the display screen.

(9)

The information processing device according to any one of (6) to (8), in which the display control unit inverts an insertion direction of the specific image into the display screen, using as an axis a vertical direction in a center of the display screen.

(10)

The information processing device according to (9), in which the insertion direction includes a direction proceeding from an outside to an inside of a field of view of a user wearing the information processing device.

(11)

The information processing device according to any one of (6) to (10), in which the specific image includes an image for arousing a user's attention.

REFERENCE SIGNS LIST 100 information processing device
102 main unit
104 arm
106 lens barrel
108 eyepiece lens
110 attachment unit
112 operation unit
120 operation detection unit
122 attitude information acquisition unit
124 control unit
126 storage unit
128 projection unit

The invention claimed is:

1. An information processing device, comprising:
a display screen configured to display a plurality of images; and
a central processing unit (CPU) configured to:
detect an operation of a plurality of operations associated with the information processing device;
determine an action of a plurality of actions based on an attitude of the information processing device and based on the detected operation; and
invert a display mode of a specific image of the plurality of images and a direction of movement of the specific image on the display screen, based on an inversion of the attitude of the information processing device and based on an axis in a vertical direction of the display screen,
wherein a display priority of the specific image is highest among display priorities of the plurality of images.

2. The information processing device according to claim 1, wherein the CPU is further configured to reorganize a correspondence relationship between each of the plurality of operations and each of the plurality of actions.

3. The information processing device according to claim 2, wherein the CPU is further configured to:
reorganize the correspondence relationship for the detected operation; and
vertically and horizontally invert the determined action based on the reorganized correspondence relationship.

4. The information processing device according to claim 1, wherein the CPU is further configured to:
acquire information based on the inversion of the attitude of the information processing device; and
determine the action based on the acquired information.

5. The information processing device according to claim 4, wherein
the information includes gravity information indicating a gravitational acceleration, and
the CPU is further configured to determine the action based on a direction of the gravitational acceleration with respect to a reference direction.

6. The information processing device according to claim 1, wherein
   the CPU is further configured to invert a display position of the specific image based on the axis, and
   the axis corresponds to the vertical direction in a center of the display screen.

7. The information processing device according to claim 6, wherein
   the information processing device is wearable on a user head, and
   the display position of the specific image is closer to a center of a user field of view than a specific position on the display screen.

8. The information processing device according to claim 1, wherein
   the axis corresponds to the vertical direction in a center of the display screen.

9. The information processing device according to claim 8, wherein
   the information processing device is wearable on a user head, and
   the direction of movement of the specific image is from an outside of a user field of view to an inside of the user field of view.

10. The information processing device according to claim 1, wherein the specific image includes an alert image.

11. The information processing device according to claim 1, wherein
    the direction of movement of the specific image is a first direction prior to the inversion of the attitude of the information processing device,
    the direction of movement of the specific image is a second direction based on the inversion of the attitude of the information processing device, and
    the first direction is opposite to the second direction.

12. The information processing device according to claim 5, further comprising an acceleration sensor, wherein the CPU is further configured to acquire the gravity information from the acceleration sensor.

13. The information processing device according to claim 5, wherein the CPU is further configured to determine a value of the gravitational acceleration in the reference direction.

14. The information processing device according to claim 5, wherein the CPU is further configured to invert a display position of the specific image based on a change in a direction of the gravitational acceleration.

* * * * *